United States Patent
Denny et al.

(10) Patent No.: US 8,418,231 B2
(45) Date of Patent: Apr. 9, 2013

(54) METHODS, SYSTEMS, AND COMPUTER PROGRAM PRODUCTS FOR MANAGING MEDIA CONTENT BY CAPTURING MEDIA CONTENT AT A CLIENT DEVICE AND STORING THE MEDIA CONTENT AT A NETWORK ACCESSIBLE MEDIA REPOSITORY

(75) Inventors: Michael Denny, Sharpsburg, GA (US); Hong Nguyen, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1157 days.

(21) Appl. No.: 11/590,008

(22) Filed: Oct. 31, 2006

(65) Prior Publication Data
US 2008/0148358 A1    Jun. 19, 2008

(51) Int. Cl.
*G06F 7/04* (2006.01)
(52) U.S. Cl. .......................................................... 726/4
(58) Field of Classification Search ............. 725/46, 725/62, 73, 86, 87; 455/456, 435, 557; 709/206, 709/225, 229
See application file for complete search history.

(56) References Cited

U.S. PATENT DOCUMENTS

| | | | |
|---|---|---|---|
| 6,177,931 B1 | 1/2001 | Alexander | |
| 7,639,943 B1* | 12/2009 | Kalajan | 709/203 |
| 2003/0087649 A1* | 5/2003 | Bhatia et al. | 455/456 |
| 2005/0028207 A1 | 2/2005 | Finseth | |
| 2005/0132183 A1* | 6/2005 | Gearhart | 713/150 |
| 2005/0273489 A1* | 12/2005 | Pecht et al. | 709/203 |
| 2006/0069756 A1* | 3/2006 | Singh et al. | 709/220 |
| 2007/0094691 A1* | 4/2007 | Gazdzinski | 725/62 |
| 2007/0111717 A1 | 5/2007 | Mueller | |
| 2007/0156521 A1 | 7/2007 | Yates | |
| 2007/0217436 A1* | 9/2007 | Markley et al. | 370/401 |
| 2008/0115172 A1 | 5/2008 | Denny | |
| 2008/0141303 A1 | 6/2008 | Walker | |
| 2008/0201754 A1 | 8/2008 | Arling | |
| 2008/0307475 A1 | 12/2008 | Liwerant | |

* cited by examiner

*Primary Examiner* — Brandon Hoffman
(74) *Attorney, Agent, or Firm* — Guntin & Gust, PLC; Douglas Schnabel

(57) ABSTRACT

Media content is managed by defining a list of authorized recipients in a network accessible security information repository, recording media content at a client device, obtaining the list of authorized recipients at the client device, associating at least one of the authorized recipients with the media content, and transmitting the media content along with information identifying the at least one of the authorized recipients associated therewith from the client device to a network accessible media repository for storage therein. The media content includes audio, video, and/or image content.

20 Claims, 6 Drawing Sheets

METHODS, SYSTEMS, AND COMPUTER PROGRAM PRODUCTS FOR MANAGING MEDIA CONTENT BY CAPTURING MEDIA CONTENT AT A CLIENT DEVICE AND STORING THE MEDIA CONTENT AT A NETWORK ACCESSIBLE MEDIA REPOSITORY

BACKGROUND OF THE INVENTION

The present invention relates to managing media content, and, more particularly, to methods, systems, and computer program products for managing media content in a communication network.

Various electronic devices, such as Personal Digital Assistants (PDAs), have been developed to help people manage their affairs. PDAs were originally designed to function primarily as personal organizers, but have evolved to be used in a variety of ways, such as a calculator, a clock, a calendar, a game, an Internet access device, an electronic mail device, a radio, an audio recorder, a video recorder, a camera, an address book, a phone, and/or a spreadsheet. Some such devices may be used by people to create audio memos to assist in managing tasks for themselves, their family, and/or friends. "Memory jogger" solutions have traditionally been designed for a single user. For example, devices with personal recorders or dictation functions may be used to record audio memos, but generally require the original device to retrieve the memo. Voice messaging systems may allow a caller to leave a message for missed called parties. A voice message must typically be delivered separately to each called party and the voice messages are generally managed by the receiver, not the sender. Moreover, voice messages are typically associated with the called party phone number, not an individual.

SUMMARY

According to some embodiments of the present invention, media content is managed by defining a list of authorized recipients in a network accessible security information repository, recording media content at a client device, obtaining the list of authorized recipients at the client device, associating at least one of the authorized recipients with the media content, and transmitting the media content along with information identifying the at least one of the authorized recipients associated therewith from the client device to a network accessible media repository for storage therein. The media content comprises audio, video, and/or image content.

In other embodiments, recording the media content, associating at least one of the authorized recipients with the media content, and transmitting the media content are performed responsive to at least one prompt provided via the client device.

In still other embodiments, the client device is an Internet Protocol (IP) device and the network comprises an IP Multimedia Subsystem (IMS) network. The method further comprises authenticating the client device in the IMS network, determining that the authenticated client device is authorized to store the media content in the media repository, and storing the media content in the media repository responsive to determining that the client device is authorized to store the media content in the media repository.

In still other embodiments, obtaining the list of authorized recipients is performed responsive to authentication of the client device.

In still other embodiments, recording the media content at the client device comprises recording the media content at the client device while maintaining a call session at the client device.

In still other embodiments, the media content is audio content.

In still other embodiments, the security information repository and the media repository have at least one server associated therewith. The method further comprises authenticating the client device at the at least one server associated with the security information repository and the media repository, determining that the authenticated client device is authorized to store the media content in the media repository, and storing the media content in the media repository responsive to determining that the client device is authorized to store the media content in the media repository.

In still other embodiments, the security information repository and the media repository have at least one server associated therewith. The method further comprises receiving a request from a requesting client device to access the stored media content at the at least one server, authenticating the requesting client device, determining that the authenticated requesting client device is authorized to access the stored media content, and providing the requesting client device access to the stored media content responsive to determining that the authenticated requesting client device is authorized to access the stored media content.

In still other embodiments, the requesting client device is an Internet Protocol (IP) device and the network comprises an IP Multimedia Subsystem (IMS) network. In addition, authenticating the requesting client device comprises authenticating the requesting client device in the IMS network.

In still other embodiments, authenticating the requesting client device comprises authenticating the requesting client device at the at least one server associated with the security information repository and the media repository.

In still other embodiments, determining that the authenticated requesting client device is authorized to access the stored media content comprises comparing an identity of a user associated with the requesting client device with the at least one of the authorized recipients associated with the media content.

In still other embodiments, the media content is audio content, and providing the requesting client device access to the stored media content comprises playing the audio content to the requesting client device.

In still other embodiments, the client device and the requesting client device are the same device.

In further embodiments, a system for managing media content comprises a network accessible security information repository that contains a list of authorized recipients for the media content, the list of authorized recipients being accessible to a client device over the network and a media repository that is configured to receive the media content over the network for storage therein, the media content having been recorded at a client device and associated with at least one of the authorized recipients. The media content comprises audio, video, and/or image content.

In still further embodiments, the client device is an Internet Protocol (IP) device.

In still further embodiments, the media content is audio content.

In still further embodiments, the security information repository and the media repository have at least one server associated therewith.

In still further embodiments, the media content is audio content and the at least one server is configured to play the audio content to a requesting client device responsive to a request therefor.

In still further embodiments, the client device and the requesting client device are the same device.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
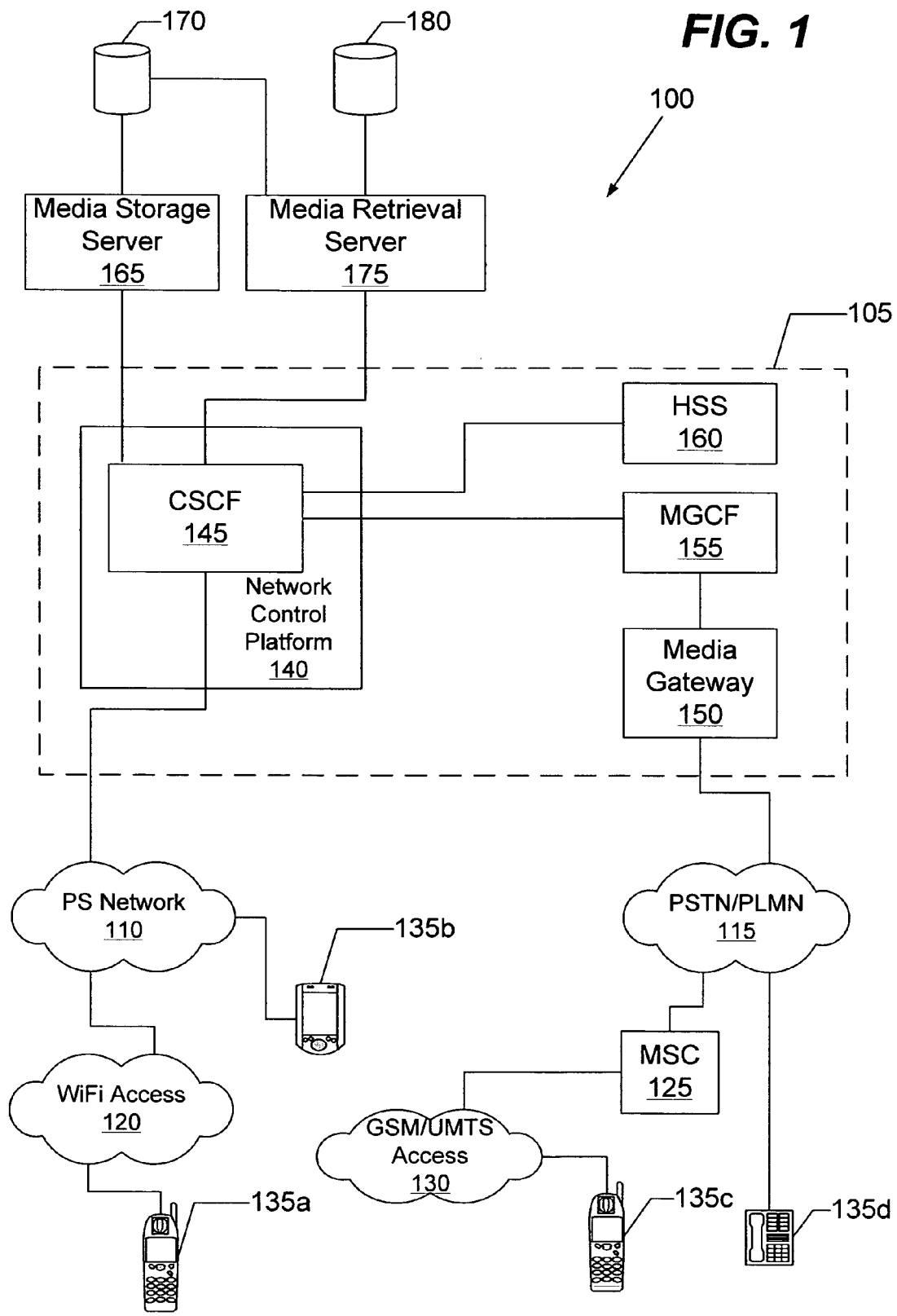
FIG. 1 is a block diagram that illustrates a communication network architecture for managing media content in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "Internet Protocol (IP) terminal or device" refers to a terminal or device that may communicate using the session initiation protocol (SIP). It will be understood that an IP terminal or device may also refer to devices that communicate using SIP via a media gateway, which translates communications, for example, between an IP network and another network, such as the public switched telephone network or a circuit switched wireless network.

Some embodiments of the present invention are described herein with respect to managing audio files or messages. It will be understood that the present invention is not limited to these examples as the principles of the present invention can be applied to media content generally, including, but not limited to, video files, image/picture files, text files, and/or data files.

Some embodiments of the present invention arise from a realization that media content can be captured or recorded at a client device and then transmitted to a network accessible media storage repository where it can be retrieved by others who have been authorized to access the media content. Advantageously, messages or memos, for example, can be relatively easily distributed to an audience of people without the need to repeat the messages or memos for each individual recipient. The memos or messages can be retrieved using various types of devices and does not require the use of any specific device, such as the client device that originally captured or recorded the memo or message.

Referring now to FIG. 1, an exemplary communication network 100, in accordance with some embodiments of the present invention, comprises an Internet Protocol (IP) multi-media-subsystem (IMS) network-105 that is coupled to a packet switching network 110 and a Public Switched Telephone Network (PSTN)/Public Land Mobile Network (PLMN) 115. The packet switching network 110 is coupled to a WiFi access network 120. The PSTN/PLMN network 115 is coupled to a mobile switching center 125, which supports, for example, a Global System for Mobile Communications (GSM)/Universal Mobile Telecommunications System (UMTS) access network 130. It will be understood that embodiments of the present invention are not limited to GSM and/or UMTS. Other cellular communication protocols can be used, such as, for example, Advanced Mobile Phone Service (AMPS), ANSI-136, General Packet Radio Service (GPRS), enhanced data rates for GSM evolution (EDGE), code division multiple access (CDMA), wideband-CDMA, and/or CDMA2000. As shown in FIG. 1, cellular base stations comprising the access network 130 may be connected to one or more mobile switching centers 125, which, in turn, can be connected to a PSTN/PLMN 115 or other network.

The packet switching network 110 and the PSTN/PLMN may provide either direct or indirect network access to various types of client devices. For example, the packet switching network 110 via the WiFi access network 120 may provide network access to a WiFi client device 135a. The packet switching network 110 may also provide network access directly to a client device 135b. The PSTN/PLMN 115 may provide network access to a GSM client device 135c indirectly through the GSM/UMTS access network 130 and the mobile switching center 125. The PSTN/PLMN 115 may also provide network access directly to a conventional Plain Old Telephone Service (POTS) phone 135d. The client devices 135a, 135b, and 135c may be IP client devices in that they may be capable of communicating using SIP. Client device 135d may not be capable of setting up communication sessions via SIP.

The packet switching network 110 connects to the IMS network 105 via the network control platform 140. The network control platform 140 comprises a call session control function (CSCF) 145. The CSCF 145 is connected to a media storage server 165 and a media retrieval server 175 and enables the registration of IP terminals/devices and the routing of SIP signaling messages between the servers 165 and 175 and the client devices 135a and 135b. The CSCF 145 may provide similar functionality for the client devices 135c and 135d connected to the network 105 via a media gateway 150 and a media gateway control function (MGCF) 155. The MGCF 155 enables SIP signaling to inter-work with other types of signaling used by the media gateway 150. Thus, the combination of the MGCF 155 and the media gateway 150 may provide an interface between the SIP signaling used in the IMS network 105 and the signaling used in the PSTN/PLMN 115.

The IMS network 105 may further comprise a home subscriber server (HSS) database 160 that maintains a service profile and other information for each end-user and associated IP terminal/device that has registered with the IMS network 105. The profile and other information may include, but is not limited to, IP address information, roaming information, and/or telephony services information.

The media storage server 165 may be configured to facilitate the storage of media content that has been recorded or captured on a client device and transmitted to the media storage server 165. In more detail, the media storage server 165 may store the media content in a media repository 170. In some embodiments, the media content may be stored in a database in the media repository 170. It will be appreciated that a media content database may be implemented using any of a number of different types of database structures, including, but not limited to, databases following relational, hierarchical, network and object database models. Generally, a media repository may be implemented in a single storage device or distributed over multiple devices in, for example, a networked configuration.

The media retrieval server 175 may be configured to allow client devices to access media content that has been stored on the media repository 170. In some embodiments, the media retrieval server 175 may communicate with a security information repository 180 that contains information identifying who is authorized to access the various media content files that have been stored in the media repository 170. The security information may be stored in a database in the security information repository 180. Like the media content database, the security information database may be implemented using any of a number of different types of database structures, including, but not limited to, databases following relational, hierarchical, network and object database models. The security information repository may be implemented in a single storage device or distributed over multiple devices in, for example, a networked configuration.

Although shown as separate servers, the media storage server 165 and the media retrieval server 175 may be implemented as a single server, separate servers, or a network of servers either co-located in a server farm, for example, or located in different geographic locations. Likewise, the media repository 170 and the security information repository 180 may be implemented as a single repository, separate repositories, or a network of repositories located in a single location or in different geographic locations.

The various elements of the communication network 100 may be connected by a global network, such as the Internet or other publicly accessible network. Various elements of the network may be interconnected by a wide area network, a local area network, an Intranet, and/or other private network, which may not accessible by the general public. Thus, the communication network 100 may represent a combination of public and private networks or a virtual private network (VPN). Although FIG. 1 illustrates an exemplary communication network, it will be understood that the present invention is not limited to such configurations, but is intended to encompass any configuration capable of carrying out the operations described herein.

Figure 2:
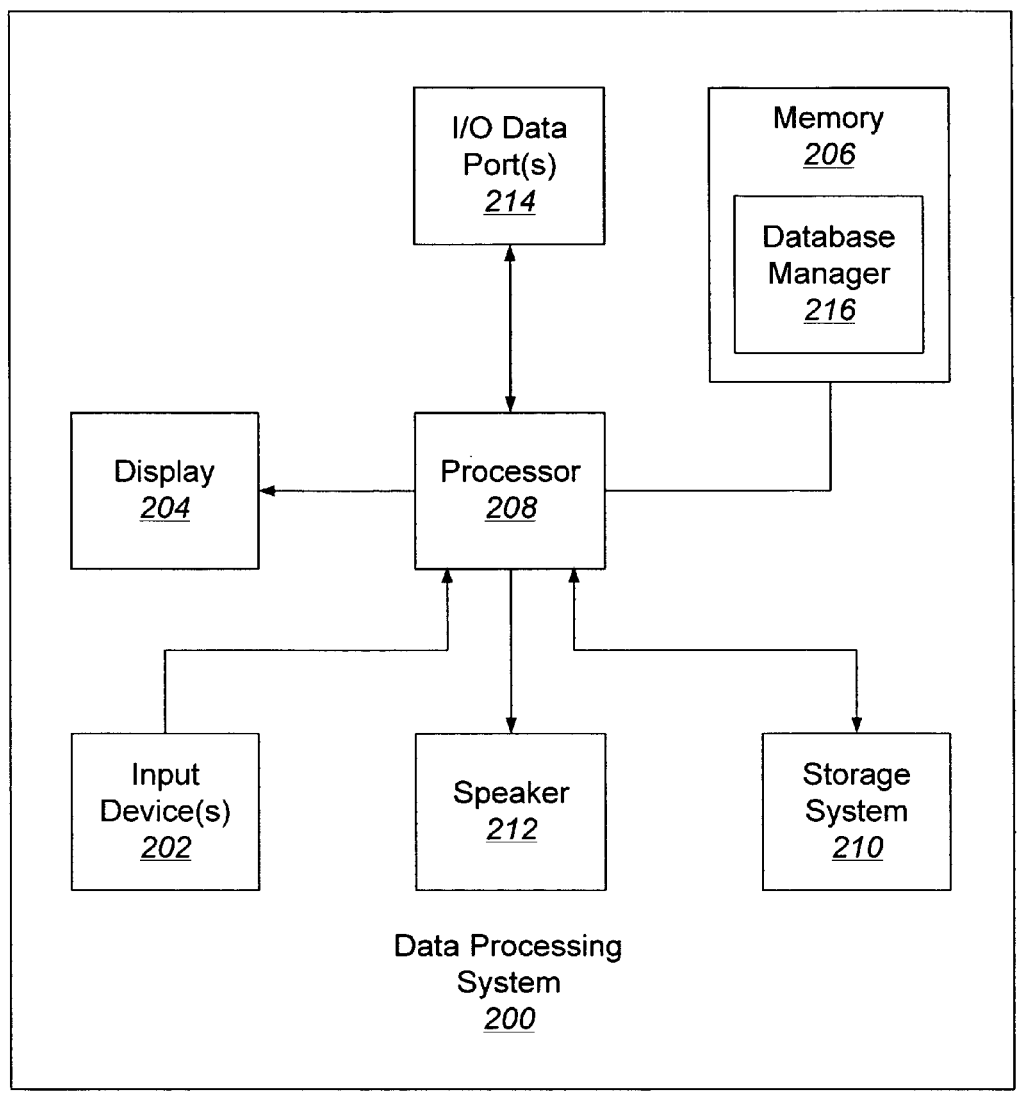
FIG. 2 is a block diagram of a data processing system that can be used to implement media servers shown in FIG. 1.

Referring now to FIG. 2, a data processing system 200 that may be used to implement the media storage server 165 and/or the media retrieval server 175 of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a database manager 216 that may be used to manage the security information in the security information repository 180 and/or the media content in the media repository 170.

Figure 3:
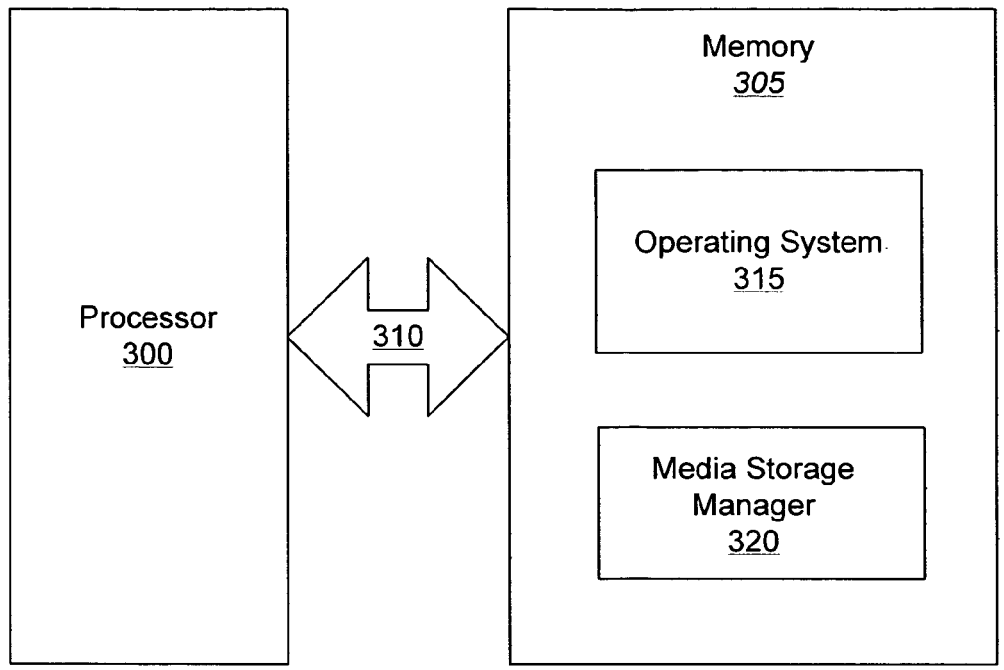
FIG. 3 is a block diagram that illustrates a software/hardware architecture for a media storage server in accordance with some embodiments of the present invention.

FIG. 3 illustrates a processor 300 and memory 305 that may be used in embodiments of the media storage server 165 of FIG. 1 and data processing system 200 of FIG. 2 in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used for managing media content in a media repository, such as the media repository 170 of FIG. 1, in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a media storage manager 320. The operating system 315 generally controls the operation of the media-storage server. In particular, the operating system 315 may manage the media storage server's software and/or hardware resources and may coordinate execution of programs by the processor 300. The media storage manager 320 may be configured to receive media content that is recorded/captured at a client device and transmitted thereto and confirm that the sender is authorized to store the media content in the media repository. The media storage manager 320 may also be configured to interface with a database that is used to store and provide access to the media content in the media repository.

Figure 4:
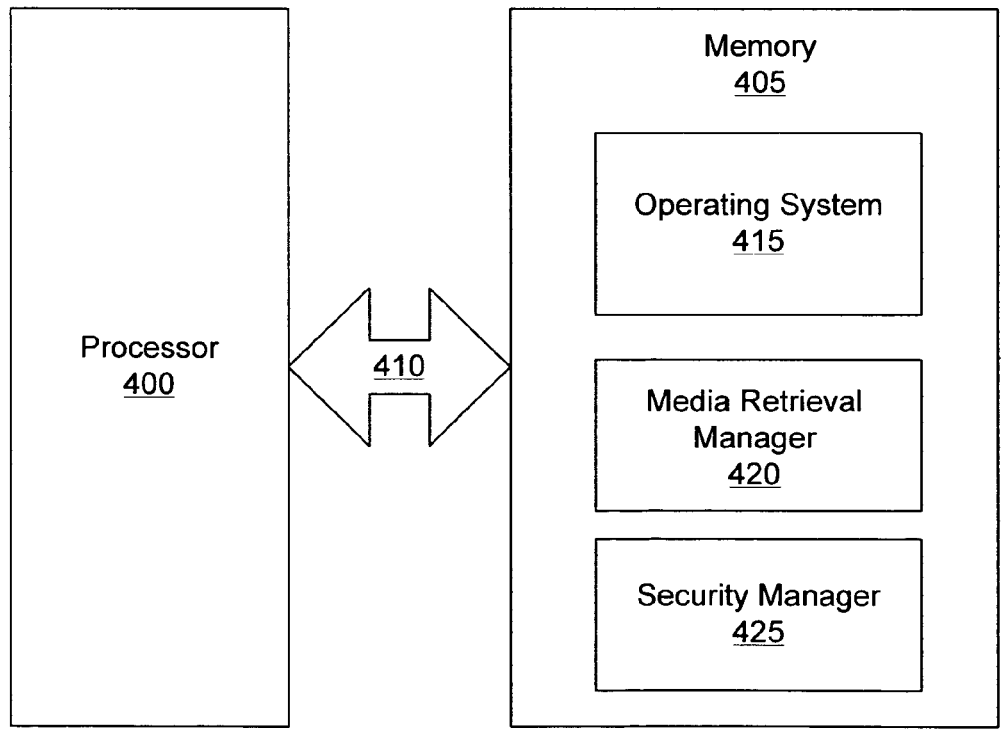
FIG. 4 is a block diagram that illustrates a software/hardware architecture for a media retrieval server in accordance with some embodiments of the present invention.

FIG. 4 illustrates a processor 400 and memory 405 that may be used in embodiments of the media retrieval server 175 of FIG. 1 and data processing system 200 of FIG. 2 in accordance with some embodiments of the present invention. The processor 400 communicates with the memory 405 via an address/data bus 410. The processor 400 may be, for example, a commercially available or custom microprocessor. The memory 405 is representative of the one or more memory devices containing the software and data used for controlling access to media content that is stored in the media repository 170 of FIG. 1, in accordance with some embodiments of the present invention. The memory 405 may include, but is not limited to, the following types of devices: cache, ROM, PROM, EPROM, EEPROM, flash, SRAM, and DRAM.

As shown in FIG. 4, the memory 405 may contain up to three or more categories of software and/or data: an operating system 415, a media retrieval manager 420, and a security manager 425. The operating system 415 generally controls the operation of the media retrieval server. In particular, the operating system 415 may manage the media retrieval server's software and/or hardware resources and may coordinate execution of programs by the processor 400. The media retrieval manager 420 may be configured to interface with the media repository and, in some embodiments, the database that is used to store the media content in the media repository so as to be able to retrieve a requested media content file and provide access to the requested media content to a requesting user/client device. In some embodiments, the media retrieval manager 420 may play the media content back through the network to the requesting client device. In other embodiments, the media retrieval manager 420 may download the media content to the requesting client device. The security manager 425 may be configured to maintain lists of authorized recipients for media content files in the security information repository 180 that may be downloaded to a client device to allow the user of the client device to determine who will be allowed to access a media content file that is to be stored in the media repository. The security manager 425 may also authenticate/authorize users and/or client devices when requests are made to access media content stored in the media repository.

Although FIGS. 3 and 4 illustrate exemplary hardware/software architectures that may be used in media storage servers and media retrieval servers, respectively, such as the media storage server 165 and media retrieval server 175 of FIG. 1, it will be understood that the present invention is not limited to such a configuration but is intended to encompass any configuration capable of carrying out operations described herein. Moreover, the functionality of the data processing system 200 of FIG. 2 and the hardware/software architectures of FIGS. 3 and 4 may be implemented as a single processor system, a multi-processor system, or even a network of stand-alone computer systems, in accordance with various embodiments of the present invention.

Computer program code for carrying out operations of data processing systems discussed above with respect to FIG. 2 and/or the software modules discussed above with respect to FIGS. 3 and 4 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 5:
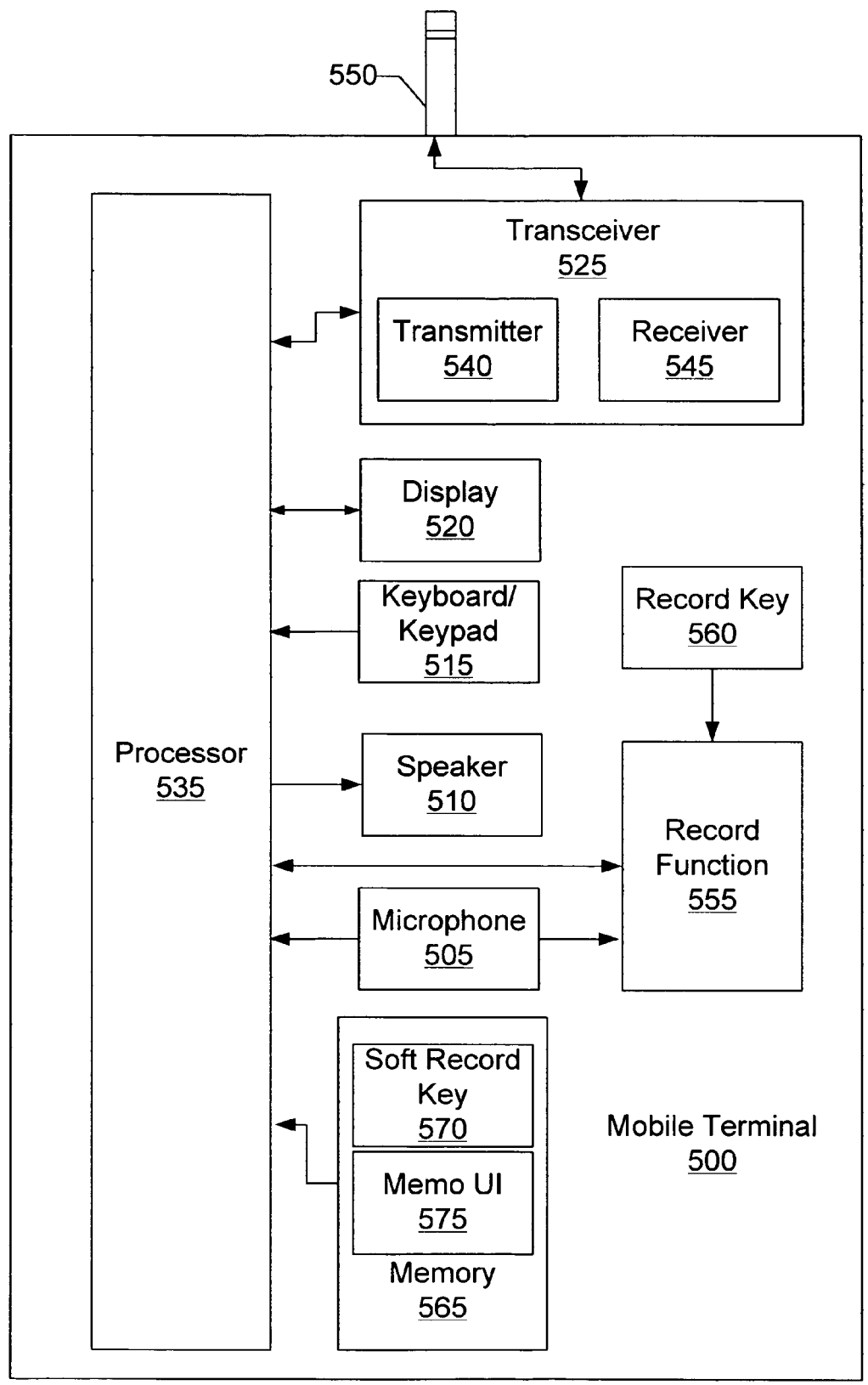
FIG. 5 is a block diagram of a client device in accordance with some embodiments of the present invention.

Referring now to FIG. 5, an exemplary client device/mobile terminal 500, in accordance with some embodiments of the present invention, may include, but is not limited to, a microphone 505, a speaker 510, a keyboard/keypad 515, a display 520, a transceiver 525, a record function 555, and a memory 565 that communicate with a processor 535. The microphone 505 may represent a single microphone or may represent multiple microphones. The transceiver 525 includes a transmitter circuit 540 and a receiver circuit 545, which, respectively, transmit outgoing radio frequency signals to, for example, base station transceivers and receive incoming radio frequency signals from, for example, the base station transceivers via an antenna 550. The radio frequency signals transmitted between the client device 500 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the client device 500, without the capabilities of the present invention, may be included in many conventional client devices and their functionality, with respect to such conventional operations, is generally known to those skilled in the art.

As shown in FIG. 5, the client device 500 includes a record function 555 that may be used to record media content, such as audio content, via the microphone 505. Advantageously, the record function 555 may be used to record media content at the client device 500 while simultaneously maintaining an active call session at the client device 500. In accordance with various embodiments of the present invention, the client device 500 may be configured with a hard record key 560 as part of the structure of the client device 500 that can be invoked by a user to record media content. In other embodiments, the memory 565 may be configured with a soft record key module 570 that provides a menu option on the display 520 that a user may select or invoke using the keyboard/keypad 515 to record media content. To assist a user in recording or capturing media content and transmitting the media content to a media repository, such as the media repository 170 of FIG. 1, the client device 500 may further include a memo user interface module 575 in the memory 565 that may be configured to provide the user with visual and/or audible prompts via the display 520 and/or speaker 510.

The present invention is described hereinafter with reference to flowchart and/or block diagram illustrations of methods, systems, client devices, and/or computer program products in accordance with some embodiments of the invention. These flowchart and/or block diagrams further illustrate exemplary operations of recording or capturing media content and storing the media content in a media repository in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 6:
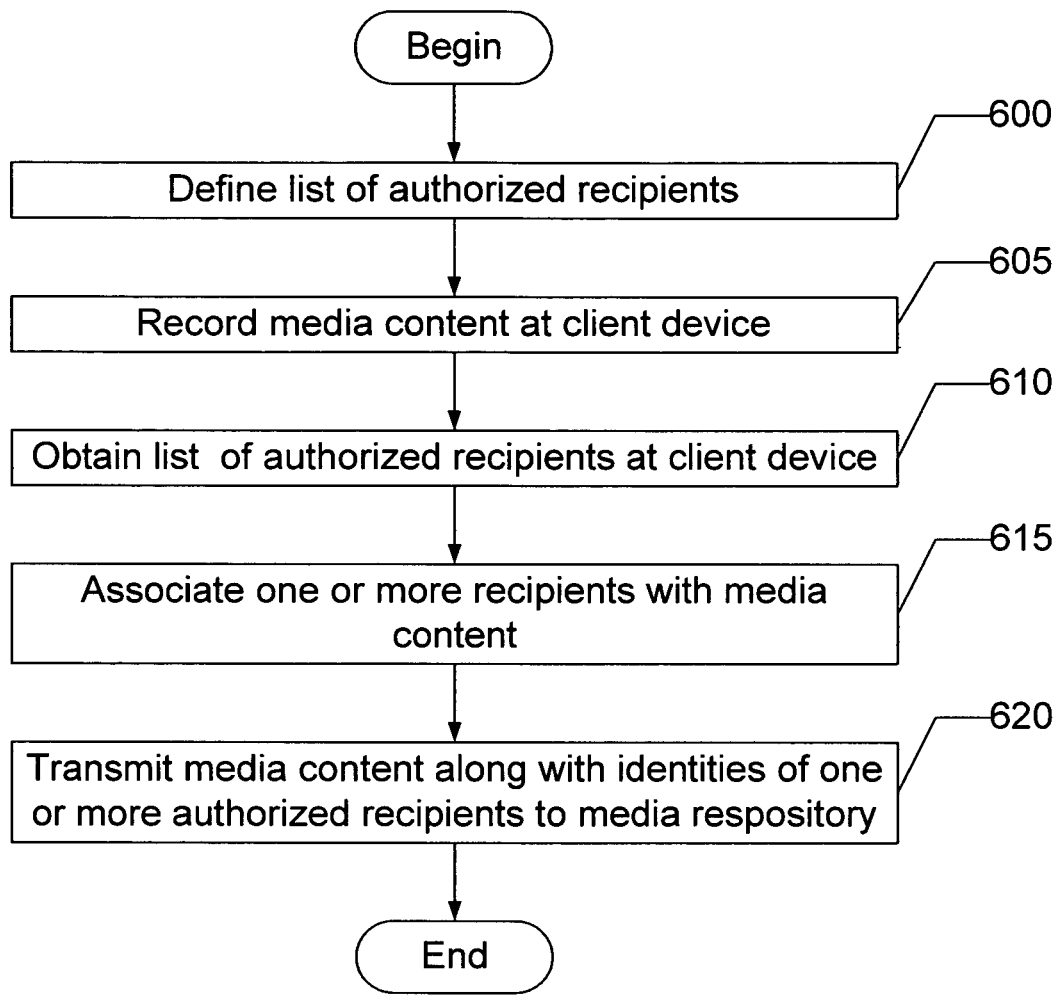
FIGS. 6-8 are flowcharts that illustrate operations for managing media content in accordance with some embodiments of the present invention.

Operations for managing media content, in accordance with some embodiments of the present invention, will now be described with reference to the flowcharts of FIGS. 6-8 and the communication network architecture of FIG. 1. Referring now to FIG. 6, operations begin at block 600 where a client device 135 may cooperate with the media retrieval server 175 to define a list of authorized recipients that a user of the client device 135 may wish to allow to access media content files that are stored in the media repository 175 by the user. In some embodiments, a user may upload his/her contacts from the client device to the media retrieval server 175. In other embodiments, the media retrieval server 175 may provide an interface that allows users to define recipients and/or client devices that are authorized to access the stored media content. By storing the list of authorized recipients at a network server, a user may maintain a common list for use with multiple client devices in one location without the need to synchronize multiple client devices with each other when a change is made to one device.

At block 605, the user may record media content at the client device 135. As discussed above with respect to FIG. 5, the user may invoke a record function on the client device 135 using a hard record key or a soft record key that is provided through the display of the client device 135. Moreover, in some embodiments, the user can initiate a media record operation while maintaining an active call session via the client device 135. The media content may be an audio message, such as a memo, that is recorded via a microphone, in some embodiments of the present invention. It will be understood, however, that the media content is not limited to audio files, but may be, but is not limited to, a picture captured via a camera, a video captured via a video recorder, a passage of text captured via a text editor or scanner, etc.

At block 610 the client device 135 may obtain the list of authorized recipients for accessing the stored media content that was defined at block 600. The user may select one or more recipients to associate with the recorded media content using, for example, a user interface on the display of the client device 135 at block 615. The recorded media content along with the identities of one or more authorized recipients are then transmitted from the client device 135 to the media storage server 165 for storage in the media repository 170 at block 620. As discussed above with respect to FIG. 5, the memo user interface module 575 may provide visual and/or audible prompts to assist a user in recording media content, obtaining the list of authorized recipients, associating one or more recipients with the recorded media content, and transmitting the media content to the media storage server 165.

Figure 7:
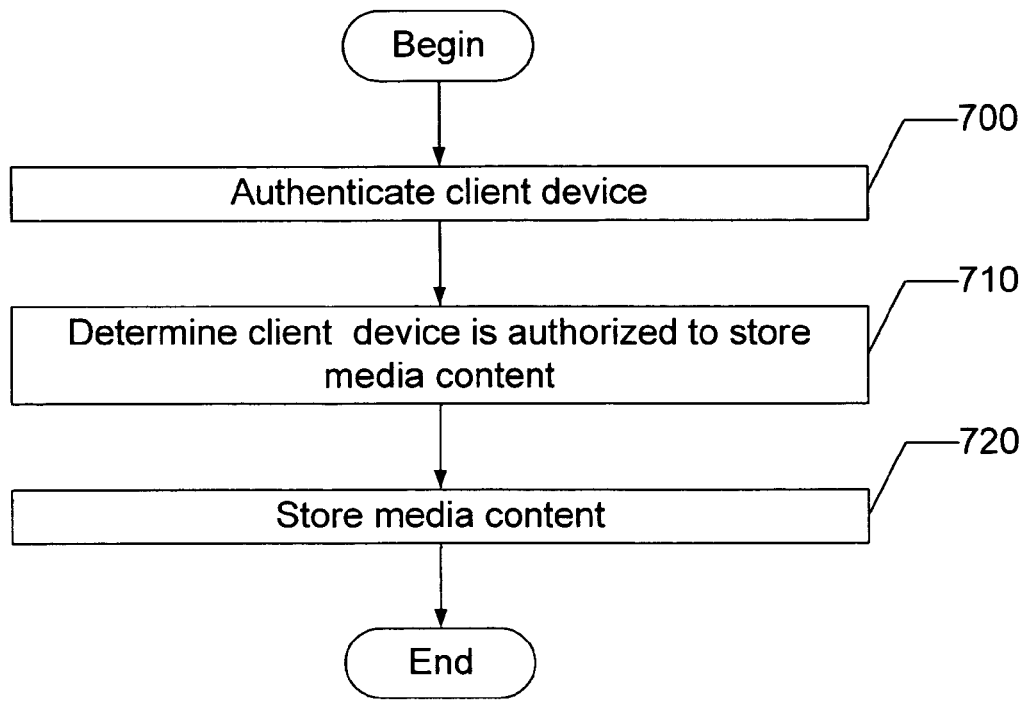

Referring now to FIG. 7, operations for storing the recorded media content in the media repository, in accordance with some embodiments of the present invention, begin at block 700 where the client device 135 is authenticated. In accordance with some embodiments of the present invention, the client device 135 may be an IP device that is authenticated in the IMS network 105. For example, referring to FIG. 1, the CSCF 145 may be configured to cooperate with various authentication databases/systems, such as the HSS database 160, that maintain a service profile and other information for each end-user and associated SIP/IMS terminal/device that has registered with the CSCF 145. The profile and other information may include, but is not limited to, IP address information, roaming information, and/or telephony services information. The CSCF 145 may cooperate with at least one service control point (SCP), which manages a home location register (HLR) for the CSCF 145. The HLR is a database that contains information, such as registration information, call settings, subscribed features, location information, directory information, identification information, and/or other information concerning mobile terminals that are subscribed to the CSCF 145. The HLR is also used to authenticate mobile terminals and to support mobility management features to which the user of a mobile terminal has subscribed when that user is roaming.

In other embodiments, the client device may be authenticated at the media storage server 165. In some embodiments, the client device 135 may be authenticated using the Secure Sockets Layer (SSL) protocol, which is a cryptographic protocol that provides secure communications on networks for various applications, including data transfers.

Returning to FIG. 7, the media storage server 165 may determine at block 710 whether the user and/or client device 135 is authorized to store media content on the media repository 170. In some embodiments, this authorization may be performed by verifying the authentication information obtained via the IMS network 105. In other embodiments, a user may be required to submit a user identification and password to access the media storage service. Once the user and/or client device 135 have been authenticated and authorized, the media content is stored in the media repository 170 at block 720.

Figure 8:
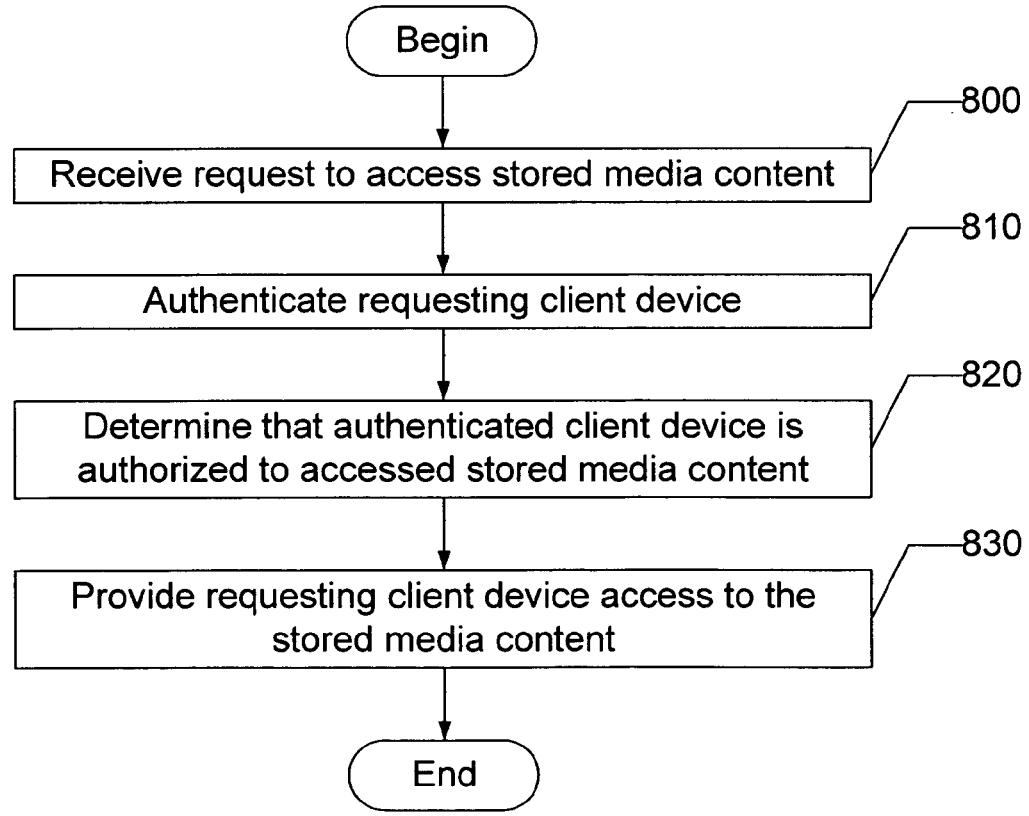

Referring now to FIG. 8, operations for retrieving media content via a client device 135 that has previously been stored in the media repository 170 begin at block 800 where the media retrieval server 175 receives a request from a client device 135 to access a stored media content file. In accordance with various embodiments of the present invention, the user and/or requesting client device may be authenticated through the IMS network 105 or at the media retrieval server 175 as discussed above with respect to block 700 of FIG. 7 and the media storage server 165. Moreover, the requesting client device 135 may, for example, use SSL to securely communicate with the media retrieval server 175 to access a stored media content file.

The media retrieval server 175 may determine at block 820 whether the user and/or requesting client device 135 is authorized to store media content on the media repository 170. In some embodiments, this authorization may be performed by verifying the authentication information obtained via the IMS network 105. In other embodiments, a user may be required to submit a user identification and password to obtain access to a stored media content file. In some embodiments, the media retrieval server 175 may determine that the authenticated requesting user and/or client device is authorized to access the requested media content by comparing the identity of a user associated with the requesting client device with the identities of the authorized recipients stored in the security information repository 180 that were associated with the media content before transmitting the media content for storage in the media repository 170 as discussed above with respect to block 615 of FIG. 6.

Once the user and/or requesting client device 135 have been authenticated and authorized, the requested media content is provided to the requesting client device 135 at block 830. In some embodiments, the requested content may be played through the network to the requesting client device. In other embodiments, the requesting client device 135 may be allowed to download the requested media content through the network.

Advantageously, the user and/or client device that was used to originally record the media content for storage in the media repository may be different from the requesting user and/or client device that seeks access to the stored media content. In this way, messages, memos, pictures, text, and/or other media can be relatively easily distributed to an audience of people without the need to repeat the messages or memos for each individual recipient. The memos or messages can be retrieved using various types of devices and does not require the use of any specific device.

The flowcharts of FIGS. 6-8 illustrate the architecture, functionality, and operations of embodiments of methods, systems, and/or computer program products for managing media content. In this regard, each block represents a module, segment, or portion of code, which comprises one or more executable instructions for implementing the specified logical function(s). It should also be noted that in other implementations, the function(s) noted in the blocks may occur out of the order noted in FIGS. 6-8. For example, two blocks shown in succession may, in fact, be executed substantially concurrently or the blocks may sometimes be executed in the reverse order, depending on the functionality involved.

Many variations and modifications can be made to the embodiments without substantially departing from the principles of the present invention. All such variations and modifications are intended to be included herein within the scope of the present invention, as set forth in the following claims.

That which is claimed:

1. A method, comprising:
   uploading, by a client device comprising a processor, at least a portion of a contact book stored at the client device to a network accessible media repository to identify a list of recipients authorized to access media content stored at the network accessible media repository;
   recording, by the client device, media content at the client device to store recorded media content;
   obtaining, by the client device, the list of recipients at the client device;
   selecting, by the client device, a first authorized recipient from the list of recipients;
   associating, by the client device, at the client device the first authorized recipient with the recorded media content; and
   transmitting, by the client device, to the network accessible media repository from the client device the recorded media content in combination with an identity of the first authorized recipient for storing at the network accessible media repository the recorded media content and its association with the identity of the first authorized recipient to enable a first client device of the first authorized recipient to access the recorded media content based on the association of the recorded media content with the identity of the first authorized recipient.

2. The method of claim 1, wherein recording the media content, associating the first authorized recipient with the media content, and transmitting the media content in combination with the identity of the first authorized recipient are performed responsive to a prompt presented at the client device.

3. The method of claim 1, wherein the client device is an internet protocol device and the network accessible media repository operates in an internet protocol multimedia subsystem network, the method comprising:
   initiating, by the client device, at the client device an authentication process in the internet protocol multimedia subsystem network;
   receiving, by the client device, at the client device an indication that the client device is authorized to store the media content in the network accessible media repository; and
   transmitting, by the client device, from the client device the media content in combination with the identity of the first authorized recipient to the network accessible media repository responsive to receiving at the client device the indication that the client device is authorized to store the media content in the network accessible media repository.

4. The method of claim 3, wherein obtaining the list of recipients at the client device is performed responsive to the client device being authenticated.

5. The method of claim 1, wherein recording the media content at the client device comprises recording the media content at the client device while maintaining a call session at the client device.

6. The method of claim 1, wherein the media content is audio content.

7. The method of claim 1, wherein a security information repository and the network accessible media repository are associated with a server, and wherein the method comprises:

initiating, by the client device, at the client device an authentication process with the server associated with the security information repository and the network accessible media repository;

receiving, by the client device, at a client device authorization to store the media content in the network accessible media repository; and transmitting, by the client device, from the client device the media content in combination with the identity of the first authorized recipient to the network accessible media repository responsive to the client device receiving authorization to store the media content in the network accessible media repository.

8. The method of claim 1, wherein the network accessible media repository performs operations comprising:

receiving a request from the first client device to access the media content stored in the server of the network accessible media repository;

authenticating the first client device;

determining that the first client device is authorized to access the media content according to the identity of the first authorized recipient received by the network accessible media repository; and providing access to the media content to the first client device responsive to determining that the first client device is authorized to access the media content.

9. The method of claim 8, wherein the first client device is an internet protocol device.

10. The method of claim 8, wherein the network accessible media repository operates in an internet protocol multimedia subsystem network.

11. The method of claim 8, wherein determining that the first client device is authorized to access the recorded media content comprises comparing an identity of a user associated with the first client device with the identity of the first authorized recipient associated with the media content.

12. The method of claim 8, wherein the media content is audio content, and wherein providing access to the media content to the first client device comprises transmitting from the server of the network accessible media repository the audio content to the first client device.

13. The method of claim 8, wherein the client device and the first client device are a same device type.

14. A system for managing media content, comprising:

a network accessible security information repository that contains a list of authorized recipients for the media content, which is recorded at a client device, the list of authorized recipients being accessible to authorized recipients over a network, wherein the list of authorized recipients is derived from at least a portion of a contact book that is stored at and uploaded from the client device; and a network accessible media repository that performs operations comprising receiving from the client device the media content in combination with the list of authorized recipients over the network for storage, the media content having been recorded at the client device and associated at the client device with the list of authorized recipients prior to being transmitted from the client device to the network accessible media repository.

15. The system of claim 14, wherein the client device is an internet protocol device.

16. The system of claim 14, wherein the media content is audio content.

17. The system of claim 14, wherein the network accessible security information repository and the network accessible media repository operate from a server.

18. The system of claim 17, wherein the media content is audio content and wherein the server performs operations comprising transmitting the audio content to a requesting client device responsive to a request comprising identification information that matches identification data of one of the list of authorized recipients.

19. The system of claim 18, Wherein the client device and the requesting client device are a same device type.

20. A mobile client device, comprising:

a memory storing computer instructions; and a processor coupled to the memory, wherein the processor, responsive to executing the computer instructions, performs operations comprising:

uploading from the mobile client device at least a portion of a contact book stored at the mobile client device to a network accessible media repository to identify a list of recipients authorized to access media content stored at the network accessible media repository;

recording media content;

obtaining the list of recipients authorized to access the media content;

associating the list of recipients with the media content; and transmitting the media content in combination with the list of recipients to the network accessible media repository for storage therein and to enable a communication device of each recipient of the list of recipients to retrieve the media content from the network accessible media repository.

* * * * *